United States Patent [11] 3,622,664

[72] Inventor John A. Brown
909 N. Alameda, Las Cruces, N. Mex. 88001
[21] Appl. No. 777,872
[22] Filed Nov. 21, 1968
[45] Patented Nov. 23, 1971

[54] TREATMENT OF INFECTIOUS KERATITIS IN ANIMALS WITH SODIUM ARSENITE
17 Claims, No Drawings

[52] U.S. Cl. .......................................................... 424/133
[51] Int. Cl. ....................................................... A61k 27/00
[50] Field of Search ............................................ 424/133, 134

[56] References Cited
UNITED STATES PATENTS
2,280,240  4/1942  Miller ............................ 424/133

OTHER REFERENCES
Chem. Abst., Vol. 54 (1960) page 25031f
Encyclopedia of Animal Care (Miller et al.) 1962, pages 218 and 921
Merck Vet. Manual, 1961, pages 207–209
Suggs, Animal Diseases (agricul.) 1956, pages 313–314

*Primary Examiner*—Sam Rosen
*Attorney*—Cushman, Darby & Cushman

ABSTRACT: Animals, particularly livestock such as cattle and sheep, having infectious keratitis (commonly known as pink-eye) are treated by administering internally, either by intramuscular injection or orally, effective amounts of sodium arsenite. When administered orally the sodium arsenite can be admixed with the animals' salt supply or feed and when provided to the animals on a regular basis is effective in preventing infection by the disease.

TREATMENT OF INFECTIOUS KERATITIS IN ANIMALS WITH SODIUM ARSENITE

The present invention is concerned with a medicinal composition for the treatment of pink-eye in livestock and with a method of effectively administering this medicinal composition to livestock.

Pink-eye or infectious keratitis is a common disease of cattle and other animals which is particularly prevalent in the western states where it causes great damage. In animals infected with the disease, the eyelids swell, the lining of the eyelids becomes red and congested, there is a mucus discharge from the eyes, and the animal shows evidence of pain. Often the animal may even become temporarily blinded, and in advanced or more serious cases there may be ulceration with subsequent destruction of the eyeball and permanent blindness.

In addition to causing great pain and injury to the infected animals themselves, the disease can also have serious economic effects since, in the case of beef cattle, the blinded cattle cannot find their way about the pasture to graze and will lose weight rapidly unless they are given time-consuming individual attention. In the case of dairy cattle there is a serious drop in milk production. Further, the cattle, which are unable to see where they are going, can seriously injure themselves by falling or running into obstructions.

Although the exact cause of infectious keratitis has not been conclusively determined, it is believed that it is caused by at least one, and possibly more species of bacteria rather than a virus. A Rickettsialike organism has been shown to be responsible for infectious keratitis in sheep and goats. Often the disease appears to be introduced into herds by new arrivals, and it is believed that it is actually spread by flies and gnats.

To a degree, spraying of the herd with insecticides and repellants and isolation of new or infected animals provides a measure of control of the disease. Antiseptic eyewashes, such as dilute silver nitrate solutions, zinc sulfate, and mercurochrome and some antibiotics have had limited success in treatment of the disease. U.S. Pat. No. 3,088,864 suggests the use of a dry mixture of potassium nitrate and kelp for the treatment of pink-eye in bovine animals. It is also known to treat the disease with various commercial preparations, such as, for example, dilute solutions of a mixture of dequalinium chloride and methylene blue.

It is the object of this invention to provide an effective medicinal composition for the treatment of infectious keratitis in animals of all types and in particular livestock such as cattle or sheep which can be easily administered either orally or by injection. It is a further object of this invention to provide methods for effectively administering this composition internally to animals.

Now in accordance with the present invention it has been discovered that infectious keratitis or pink-eye in animals, for example, ruminant animals, particularly cattle and sheep, can be successfully treated by the administering to the animal, either orally or by intramuscular injection, of effective amounts of sodium arsenite.

Where treatment is to be effected by intramuscular injection, an aqueous solution containing about 0.5 to 3 weight percent sodium arsenite can be administered to the animal to treat infectious keratitis and, if necessary, repeated at intervals of about 6 weeks. Effective amounts of the indicated aqueous solution of sodium arsenite can be, for example, about 3 to 6 cc. of the solution.

In oral treatment, effective amounts of sodium arsenite can be added to the feed or salt of the livestock to treat the disease. Effective amounts of sodium arsenite for oral treatment of infectious keratitis can be for example about 0.001 to 0.01 weight percent of the sodium arsenite. Any of the various common animal feeds, which are discussed in texts on the subject, can be employed in this invention and their use will be governed only by the usual factors of cost and availability. Salt is, of course commonly supplied, for example, in block form to animals such as cattle as a dietary supplement, and again it can be used according to this invention in conjunction with sodium arsenite in any available form and in the usual manner.

While the period of time necessary to arrest or cure the infectious keratitis may vary, 2 weeks, for example of feeding with the indicated amount of sodium arsenite may often be sufficient. If desired the mixture of 0.001 to 0.01 weight percent sodium arsenite in the feed or salt can be fed on a regular basis to the livestock to prevent infection, however, during the feeding of such mixture to the livestock, no other salt etc. should be fed or made available to the animals. A particularly effective mixture for oral administering to prevent infectious keratitis has been found to be comprised of a major portion of salt (e.g. rock salt), minor portions of meal (e.g. cotton seed or soy bean), stock minerals (e.g. calcium, phosphorous etc.) and the indicated 0.001 to 0.01 weight percent sodium arsenite.

The following examples are provided to illustrate the present invention and are not to be construed as, in sense, limiting the scope of the invention.

EXAMPLE I

Cattle infected with pink-eye were treated by injecting into the muscle of the animals one 50 cc. dose of an about 1.7 percent solution of sodium arsenite prepared by dissolving 128 grains (8.29 grams) into 500 cc. of sterile water. The dose was repeated again 6 weeks later in order to effect the complete cure of the infectious keratitis.

EXAMPLE II

Cattle infected with pink-eye were also treated by feeding them, for a period of about 2 weeks, a mixture of 200 pounds of salt, 50 pounds of cotton seed meal, 50 pounds of stock minerals (calcium, phosphorous, and trace minerals) and 3 pounds of a composition comprising a mixture of 300 pounds of salt and one pound of sodium arsenite. During the 2 week period the mixture was fed to the animals on a free choice basis, although no other salt was made available to them. In addition to providing successful treatment for existing pink-eye infection, this mixture has also proven to be effective as a preventative for the disease when administered on a free choice basis regularly at all times.

I claim:

1. The process for treating animals having infectious keratitis which comprises internally administering to said animals an effective amount of sodium arsenite.

2. The process of claim 1, wherein the sodium arsenite is administered by intramuscular injection.

3. The process of claim 2 wherein the sodium arsenite is administered by intramuscular injection of an aqueous solution containing about 0.5 to 3 weight percent sodium arsenite.

4. The process of claim 3 wherein about 3 to 6 cc. of the aqueous solution of sodium arsenite are administered by intramuscular injection.

5. The process of claim 4 wherein the sodium arsenite is administered by an intramuscular injection of about 5 cc. of an about 1.7 weight percent aqueous solution of sodium arsenite.

6. The process of claim 2 wherein the first intramuscular injection of sodium arsenite is repeated at 6 week intervals until a cure of the infectious keratitis is effected.

7. The process of claim 1, wherein effective amounts of sodium arsenite are administered to the animal orally.

8. The process of claim 7 wherein the sodium arsenite is administered orally to the animals by including effective amounts of it in the feed or salt of the animals.

9. The process of claim 8 wherein the sodium arsenite is administered orally to the animals by including about 0.001 to 0.01 weight percent sodium arsenite in the feed or salt of the animals.

10. The process of claim 8 wherein a mixture comprising a major portion of salt and minor portions of meal and stock minerals and 0.001 to 0.01 weight percent sodium arsenite are administered orally to the animals.

11. The process of claim 10, wherein a mixture comprising 200 pounds of salt, 50 pounds of cottonseed meal and 50 pounds of stock minerals, mixed with 3 pounds of composition comprising a mixture of 300 pounds salt and 1 pound of sodium arsenite are administered orally to the cattle.

12. The process of claim 1 wherein the animals being treated are livestock.

13. The process of claim 12 wherein the animals being treated are cattle or sheep.

14. A composition for treating animals having infectious keratitis which comprises a mixture of feed for said animals and 0.001 to 0.01 weight percent of sodium arsenite.

15. A composition for treating infectious keratitis in animals which comprises salt and 0.01 to 0.01 weight percent of sodium arsenite.

16. A composition for treating animals having infectious keratitis comprising a mixture of salt and feed and 0.001 to 0.01 weight percent of sodium arsenite.

17. The composition of claim 16 which comprises of mixture of about 200 pounds of salt, 50 pounds of cotton seed meal 50 pounds of stock minerals and 0.01 pounds of sodium arsenite.

* * * * *